US011493597B2

(12) United States Patent
Bruns et al.

(10) Patent No.: US 11,493,597 B2
(45) Date of Patent: Nov. 8, 2022

(54) METHOD AND CONTROL DEVICE FOR DETECTING A MALFUNCTION OF AT LEAST ONE ENVIRONMENT SENSOR OF A MOTOR VEHICLE

(71) Applicant: AUDI AG, Ingolstadt (DE)

(72) Inventors: Erich Bruns, Ingolstadt (DE); Moritz Venator, Ingolstadt (DE)

(73) Assignee: AUDI AG, Ingolstadt (DE)

(*) Notice: Subject to any disclaimer, the term of this patent is extended or adjusted under 35 U.S.C. 154(b) by 236 days.

(21) Appl. No.: 16/769,304

(22) PCT Filed: Apr. 4, 2019

(86) PCT No.: PCT/EP2019/058460
§ 371 (c)(1),
(2) Date: Jun. 3, 2020

(87) PCT Pub. No.: WO2019/197260
PCT Pub. Date: Oct. 17, 2019

(65) Prior Publication Data
US 2020/0319297 A1    Oct. 8, 2020

(30) Foreign Application Priority Data

Apr. 10, 2018  (DE) .................... 10 2018 205 322.7

(51) Int. Cl.
*G01S 7/40*      (2006.01)
*G01S 13/86*     (2006.01)
(Continued)

(52) U.S. Cl.
CPC .............. *G01S 7/40* (2013.01); *G01S 13/867* (2013.01); *G01S 13/931* (2013.01); *G05D 1/0055* (2013.01); *G07C 5/0816* (2013.01)

(58) Field of Classification Search
CPC ................................. G01S 7/40; G01S 13/931
See application file for complete search history.

(56) References Cited

U.S. PATENT DOCUMENTS 6,018,308 A * 1/2000 Shirai .................... G01S 7/412
                                                  701/1
9,043,072 B1 * 5/2015 Tisdale .................. G05D 1/027
                                                  701/28
(Continued)

FOREIGN PATENT DOCUMENTS

DE           10333323 A1    1/2004
DE           69823462 T2    4/2005
(Continued)

OTHER PUBLICATIONS

International Preliminary Report on Patentability directed to related International Patent Application No. PCT/EP2019/058460, completed Mar. 23, 2020, with attached English-language translation; 12 pages.

(Continued)

*Primary Examiner* — Peter M Bythrow
(74) *Attorney, Agent, or Firm* — Sterne, Kessler, Goldstein & Fox P.L.L.C.

(57) ABSTRACT

The present disclosure relates to a method for detecting a malfunction of at least one environment sensor of a motor vehicle operating while the motor vehicle passes a predefined gate region of a road network. Detection data is determined based at least in part on sensor data from the at least one environment sensor. A deviation of the detection data from reference data is determined. The reference data describes at least one object actually present in the gate region. An entry regarding a malfunction of the at least one environment sensor is stored when the deviation fulfills a predefined indicator criterion.

9 Claims, 3 Drawing Sheets

(51) Int. Cl.
  *G01S 13/931* (2020.01)
  *G05D 1/00* (2006.01)
  *G07C 5/08* (2006.01)

(56) References Cited

U.S. PATENT DOCUMENTS

| | | | |
|---|---|---|---|
| 9,221,396 B1* | 12/2015 | Zhu | G01S 7/40 |
| 9,336,436 B1* | 5/2016 | Dowdall | B60W 30/09 |
| 9,623,905 B2* | 4/2017 | Shashua | B60W 30/18 |
| 9,672,446 B1* | 6/2017 | Vallespi-Gonzalez | G06K 9/6267 |
| 9,719,801 B1* | 8/2017 | Ferguson | G01S 17/86 |
| 10,553,044 B2* | 2/2020 | Mercep | G05D 1/0088 |
| 11,145,146 B2* | 10/2021 | Mercep | G05D 1/0274 |
| 2003/0016161 A1* | 1/2003 | Okai | G01S 7/412 342/72 |
| 2003/0125871 A1 | 7/2003 | Cherveny et al. | |
| 2009/0002222 A1* | 1/2009 | Colburn | G01C 9/00 342/146 |
| 2009/0228204 A1* | 9/2009 | Zavoli | G01C 21/30 701/532 |
| 2010/0013615 A1* | 1/2010 | Hebert | G06T 7/74 340/425.5 |
| 2010/0076708 A1* | 3/2010 | Hukkeri | G01S 7/52004 702/94 |
| 2012/0101711 A1* | 4/2012 | Furmston | G01S 13/931 701/300 |
| 2012/0293360 A1* | 11/2012 | Hasegawa | G01S 13/34 342/146 |
| 2012/0310516 A1* | 12/2012 | Zeng | G01S 17/42 701/300 |
| 2014/0379254 A1* | 12/2014 | Miksa | G01S 17/42 701/450 |
| 2015/0066412 A1* | 3/2015 | Nordbruch | B60W 40/00 702/104 |
| 2015/0161830 A1 | 6/2015 | Lenhardt et al. | |
| 2015/0268058 A1* | 9/2015 | Samarasekera | G01C 11/02 701/409 |
| 2015/0362587 A1 | 12/2015 | Rogan et al. | |
| 2016/0223643 A1* | 8/2016 | Li | G01S 7/0236 |
| 2016/0357188 A1* | 12/2016 | Ansari | G05D 1/0274 |
| 2017/0023945 A1* | 1/2017 | Cavalcanti | G08G 1/04 |
| 2017/0080950 A1* | 3/2017 | Pink | G07C 5/0816 |
| 2017/0124781 A1* | 5/2017 | Douillard | G01S 17/931 |
| 2017/0205501 A1* | 7/2017 | Liu | G01S 13/931 |
| 2017/0212215 A1* | 7/2017 | Hellinger | G01S 13/931 |
| 2017/0270361 A1* | 9/2017 | Puttagunta | G06V 20/56 |
| 2018/0024565 A1* | 1/2018 | Fridman | G06T 7/70 701/26 |
| 2018/0172825 A1* | 6/2018 | Hsu | G01S 7/411 |
| 2018/0216942 A1* | 8/2018 | Wang | G01S 17/89 |
| 2019/0162820 A1* | 5/2019 | Agarwal | G01S 7/497 |
| 2019/0293756 A1* | 9/2019 | Blaes | G01S 7/4972 |
| 2019/0293772 A1* | 9/2019 | Pfeiffer | G05D 1/024 |
| 2021/0089058 A1* | 3/2021 | Stoschek | G01S 7/497 |
| 2021/0341598 A1* | 11/2021 | Sahara | G01S 13/343 |
| 2022/0091229 A1* | 3/2022 | Berry | G01S 13/08 |

FOREIGN PATENT DOCUMENTS

| | | | | |
|---|---|---|---|---|
| DE | 102011084264 A1 | | 4/2013 | |
| DE | 102013225563 A1 | | 6/2015 | |
| DE | 102014226020 A1 | * | 6/2016 | G01S 13/931 |
| DE | 102014226020 A1 | | 6/2016 | |
| DE | 102015217771 A1 | | 3/2017 | |

OTHER PUBLICATIONS

International Search Report and Written Opinion of the International Searching Authority directed to related International Patent Application No. PCT/EP2019/058460, dated Jul. 22, 2019, with attached English-language translation; 15 pages.

\* cited by examiner

METHOD AND CONTROL DEVICE FOR DETECTING A MALFUNCTION OF AT LEAST ONE ENVIRONMENT SENSOR OF A MOTOR VEHICLE

The present disclosure relates to a method for detecting a malfunction of at least one environment sensor of a motor vehicle. The malfunction can be detected while the motor vehicle is traveling along a road network. The present disclosure also includes a control device for performing the method.

For the further development of driver assistance systems and automated driving functions, an ever increasing amount of information about the vehicle environment is required, which is sensed by environment sensors. As environment sensors, camera, radar and laser sensors detect and classify objects in the vehicle's environment (e.g. vehicles, pedestrians, traffic signs, lane markings and boundaries) and pass this information on to the corresponding control devices. Based on this perception of the environment, driver assistance functions such as the lane departure warning system, traffic sign detection or the automatic emergency braking function can then be implemented. With regard to the development of highly automated driving functions (level 3-5), a significantly higher number of sensors for the perception of the vehicle environment will be required in the future in order to enable 360° environmental monitoring.

With an increasing range of functions and an increasing number of sensors, the requirements for the installation and calibration of these sensors also increase. In order to ensure the safe operation of automated driving functions, it must be continuously ensured that the sensors are in a proper state. Faults and errors in sensors can be divided into two main categories:

1) Sensor blindness: The field of vision and/or the range of the sensor is restricted by dirt or weather influences (e.g. fog, heavy rain); the performance of the perception functions (detection rate) decreases. The fault occurs temporarily until the cause has been remedied.

2) Decalibration: The correct calibration of a sensor ensures that the position of an object detected by the sensor can be transformed into a cross-vehicle/cross-sensor coordinate system. For this purpose, both the intrinsic (inside the sensor) and extrinsic (position of the sensor) parameters must be accurately determined. An incorrect calibration of a sensor can e.g. be caused by poor installation of the sensor (outside the specified tolerances), misalignment (e.g. due to a collision) or a failed calibration routine.

A comprehensive check of the sensor system inside the vehicle is currently only possible by installing appropriate measurement technology and testing software in the vehicle (as implemented in vehicles which are still in the development phase). In vehicles which are already produced in series, it is possible to carry out self-diagnosis using special image processing algorithms that identify restrictions of perception due to dirt and weather conditions (blindness detection). Small deviations in the calibration parameters can be corrected while driving using online calibration algorithms, which orient themselves based on landmarks (e.g. lane markings). A comprehensive check and recalibration of the sensor system can only be carried out by customer service.

The networking of vehicles via mobile data networks makes it possible to wirelessly access the sensor and bus data of customer vehicles from a distance. For example, image and data streams can be sent to a backend. By processing this so-called swarm data, knowledge can already be obtained there, e.g. in relation to user and system behavior and the environmental conditions (weather, road conditions, traffic jams, etc.).

A self-diagnosis of a sensor system with at least one environment sensor therefore tries to detect faults in an environment sensor using conspicuous patterns and special algorithms. However, there is the problem that a reference truth (ground truth) is not known in a motor vehicle. In the case of blindness detection (an environment sensor does not detect any objects), this means, for example, that it cannot be ascertained beyond any doubt whether a restricted view or missing objects are the reason why no objects are detected in the environment of the motor vehicle. The verification of a correct calibration is also not possible due to the lack of reference truth regarding the positions of actually present objects. Suitable measurement conditions can only be provided in a service workshop.

Visiting a service workshop is, however, associated with effort for a user of a motor vehicle, which is why one is very interested in providing reliable detection of a malfunction of at least one environment sensor in a motor vehicle in normal driving operation. A false alarm rate that is too high would, however, lead to an unnecessary interruption of the driving operation in order to visit a service workshop. On the other hand, an excessively high detection threshold for malfunctions could endanger a user of the motor vehicle, in particular in the case of automated driving functions, if the environment sensors are used by an autopilot for automated driving of the motor vehicle.

A self-diagnosis for a pressure sensor and a temperature sensor and a brightness sensor and a rain sensor of a motor vehicle is known from DE 10 2013 225 563 A1. The motor vehicle receives the sensor data of a comparable sensor from at least one other motor vehicle. This then makes reference data available in the motor vehicle. However, this method requires that the motor vehicles use similar sensors so that their sensor data are comparable. In addition, this method is only suitable for directly comparing two sensors in order to identify a defective sensor. In addition, the comparative measurements must have taken place at the same time, since the compared measured variables change over time.

From DE 10 2015 217 771 A1 it is known that in a motor vehicle when using several sensors, their sensor signals can be compared in order to be able to detect whether one of the sensors has failed. In this way, a total failure of a sensor can be detected. However, in the event that there is actually no measurement signal and instead the other sensor, which generates a measurement signal, does so only because of a defect (for example, it generates noise), this would result in a mix-up.

From DE 103 33 323 A1 it is known to provide redundant sensors in a motor vehicle so that the sensors can be mutually monitored. However, this is associated with a considerable effort due to the necessity to install several sensors.

The object of the present disclosure is to provide a malfunction detection in a motor vehicle for at least one environment sensor with which objects can be detected in an environment of the motor vehicle.

The object is achieved by the subject matter of the independent claims. Advantageous embodiments of the present disclosure are described by the dependent claims, the following description and the figures.

The present disclosure provides a method for detecting a malfunction of at least one environment sensor of a motor vehicle. For this purpose, the at least one environment sensor is operated while the motor vehicle passes a predefined route section of a road network, that is to say drives through or drives past it. This route section is referred to below as the gate region. On the basis of respective sensor data of the at least one environment sensor, respective detection data are determined. The respective detection data each describe which at least one object in the gate region was detected on the basis of the sensor data of the respective environment sensor. The detection data therefore indicate which at least one object could be sensed or detected in the area surrounding the motor vehicle. The detection data can be generated from the sensor data, for example on the basis of object detection. The object detection can detect the at least one object in the sensor data, for example segment it. In addition, a shape and/or a relative position of the respective object with respect to the motor vehicle can be detected and described by the detection data. For example, the detection data can be generated from the sensor data on the basis of an artificial neural network and/or an image processing algorithm.

In order to be able to check the at least one environment sensor for a malfunction, reference data which describe at least one object actually present in the gate region are kept at hand in the motor vehicle. It is known from the reference data whether there is actually an object in the gate region and which at least one object is located in the gate region. Such an object is, in particular, always a stationary object, i.e. a landmark (for example a road sign or a traffic light or a lamp or a bridge) or a structure (for example a specific floor covering or a grass area or a scaffold). A deviation of the respective detection data of the at least one environment sensor from the reference data is now determined. If the deviation of the detection data of an environment sensor fulfills a predefined indicator criterion, for the respective environment sensor, the detection data of which fulfills the indicator criterion, an entry regarding the malfunction of the environment sensor is stored. First of all, it is only registered that it was detected from the detection data that the environment sensor may have a malfunction. For example, a counter value can be incremented or decremented as an entry.

When the motor vehicle is traveling, a check of its functionality, that is to say a detection of a malfunction, can thus be carried out automatically when a gate region for the at least one environment sensor is passed. The reference data is used to describe which object is actually present in the gate region, so that a reference truth (ground truth) is provided, which can be used to check the detection data of the at least one environment sensor for plausibility, i.e. the indicator criterion. For this purpose, a deviation of the respective detection data of the at least one environment sensor is determined from the reference data, and if the deviation fulfills the indicator criterion, for the respective environment sensor, the detection data of which fulfills the indicator criterion, an entry regarding the malfunction of the environment sensor is stored. The entry therefore signals a possible malfunction.

The advantage of the present disclosure is that a motor vehicle can independently check whether an environment sensor is malfunctioning. The motor vehicle can carry out this check while driving along a road network, specifically whenever it passes a gate region for which reference data are available. A different gate region can be provided for each sensor type. By means of the method, a camera and/or a radar and/or an ultrasonic sensor and/or a lidar can be checked for malfunction as an environment sensor. A different gate region can be defined or provided for each sensor type.

The present disclosure also includes embodiments which yield additional advantages.

The said indicator criterion is a limit measure for the deviation or a limit value for the deviation. If this limit measure or limit value is exceeded (i.e. the indicator criterion is met), it can be assumed that the detection data of a respective environment sensor deviate from the reference data due to a malfunction or another fault. Therefore, an entry regarding the malfunction of the environment sensor is stored. The indicator criterion can, for example, describe a deviation in the number of objects detected, a misclassification of a respective detected object and/or a position deviation of the respectively detected object. Correspondingly, the reference data describe the at least one object actually present, for example in relation to its class and/or position and/or orientation. Here, "class" means that a type of object (for example a road sign, lantern, bridge) is specified.

According to one embodiment, the indicator criterion differentiates between sensor blindness and decalibration. In the case of sensor blindness, at least one object actually present in the gate region remains undetected, that is to say it is not specified or described in the detection data. In the case of a decalibration, on the other hand, at least one object actually present in the gate region is detected, but at an incorrect position and/or with an incorrect spatial orientation. The distinction has the advantage that an error type or the nature of an error can be inferred. In the case of sensor blindness, a sensor can fail or be covered, for example, by dirt. In the case of a decalibration, on the other hand, it can be assumed that the environment sensor has been adjusted or moved and thus its original spatial orientation has been changed in relation to the rest of the motor vehicle. This can be caused, for example, by an impact.

One embodiment provides that the reference data describes a class and/or position and/or dimension and/or proportion (aspect ratio) of the at least one object that is actually present. This has the advantage that an appearance (class) and/or geometric dimensions can be used to detect a malfunction of an environment sensor.

According to one embodiment, several actually present objects are described by the reference data. This has the advantage that an inaccuracy or sensor scatter of an environment sensor is less likely to lead to false positive detection of a malfunction. The reason for this is that the measurement inaccuracy of an environment sensor can be determined for several objects. If, on the other hand, only a single object is described, the environment sensor must, for example, determine its position more accurately in order to detect an inclined position or a change in the spatial orientation of the sensor. If, on the other hand, several objects are described by the reference data, a change, for example, in the rotational position or in general in the spatial orientation of an environment sensor, can be detected, for example, on the basis of a change in the connecting lines of the objects, as can be seen on a camera image or in general in the detection data. In the case of several objects, triangulation and/or trilateration can in particular also be carried out on the basis of the sensor data in order to determine a spatial orientation or orientation of the respective environment sensor.

One embodiment provides that the reference data describes a ratio of at least two characteristic features of the at least one object actually present. So an absolute value is not described, but a relative value, namely a ratio. For example, the distance between a road sign and the road can be specified in relation to the lane width of the road. This has the advantage that a difference in the scaling in the detection data on the one hand and in the reference data on the other hand nevertheless enables a comparison of the detection data with the reference data.

One embodiment provides that a malfunction signal is generated for such an environment sensor, for which a number of entries relating to the malfunction is greater than a predefined threshold value. The number can be greater than 1, in particular greater than 3 or 5. In other words, the malfunction signal is not generated immediately in the case of a single entry, but the malfunction signal is only generated after passing through several gate regions if there is more than the predefined number of entries. This can compensate for the fact that detection of an object actually present in a single gate region can also fail for reasons other than a malfunction. For example, an object may be covered by another motor vehicle during an overtaking maneuver, so that for this reason alone it cannot be detected by an environment sensor.

If the malfunction signal is generated, one embodiment provides that, depending on the malfunction signal, a warning message is issued to a user and/or a vehicle function that uses the sensor data of the environment sensor (identified as faulty) is deactivated. By outputting a note there is the advantage that the user can adapt his behavior to the environment sensor identified as faulty. Deactivating a driving function has the advantage that it is avoided that this driving function generates an incorrect control signal due to incorrect sensor data. A vehicle function that is deactivated in this way can in particular be an autopilot of the motor vehicle.

One embodiment provides that, depending on the malfunction signal, a predefined remedy for recalibration is initiated and the remedy provides that after passing through the gate region and/or at least one further gate region on the basis of sensor data determined there and reference data available or provided for the respective gate region respective calibration data are generated for the at least one environment sensor (detected as defective). The actually present at least one object and the reference data available for this purpose are therefore used to carry out a calibration of an environment sensor of the motor vehicle. The calibration data is used to set a mapping rule or a mapping function which maps the sensor data to the reference data. In other words, correction values are provided with the calibration data in order to correct the sensor data so that they match the reference data.

One embodiment provides that the reference data is generated by a server device receiving respective detection data for objects along the road network from a plurality of other motor vehicles and a route section of the road network in which the detection of the objects there fulfills a predefined quality criterion is defined as the gate region. The detection data for the objects along the route section, which is defined as the gate region, are combined to form the reference data. For example, they can be stored together as a data record and/or an average can be generated from the detection data of different motor vehicles. The quality criterion can, for example, specify a minimum number of present objects. The quality criterion can additionally or alternatively require, for example, that the detection data must have been generated or calculated by the motor vehicles with a predefined minimum confidence. In this way, at least one gate region can be automatically determined in said road network. A confidence value can be generated, for example, by an object detection device which generates the detection data in a manner known from the prior art.

The present disclosure also includes a control device for a motor vehicle. Such a control device can be configured, for example, as a control device for a motor vehicle. The control device has a processor device which is set up to carry out an embodiment of the method according to the present disclosure. For this purpose, the processor device can comprise at least one microcontroller and/or at least one microprocessor. The method steps can be implemented as program code for the processor device. The program code may be stored in a data memory of the processor device.

Said motor vehicle is in particular a motor vehicle, such as a passenger car or truck.

The present disclosure also includes the combinations of the described embodiments.

Exemplary embodiments of the present disclosure are described below, in which.

Figure 1:
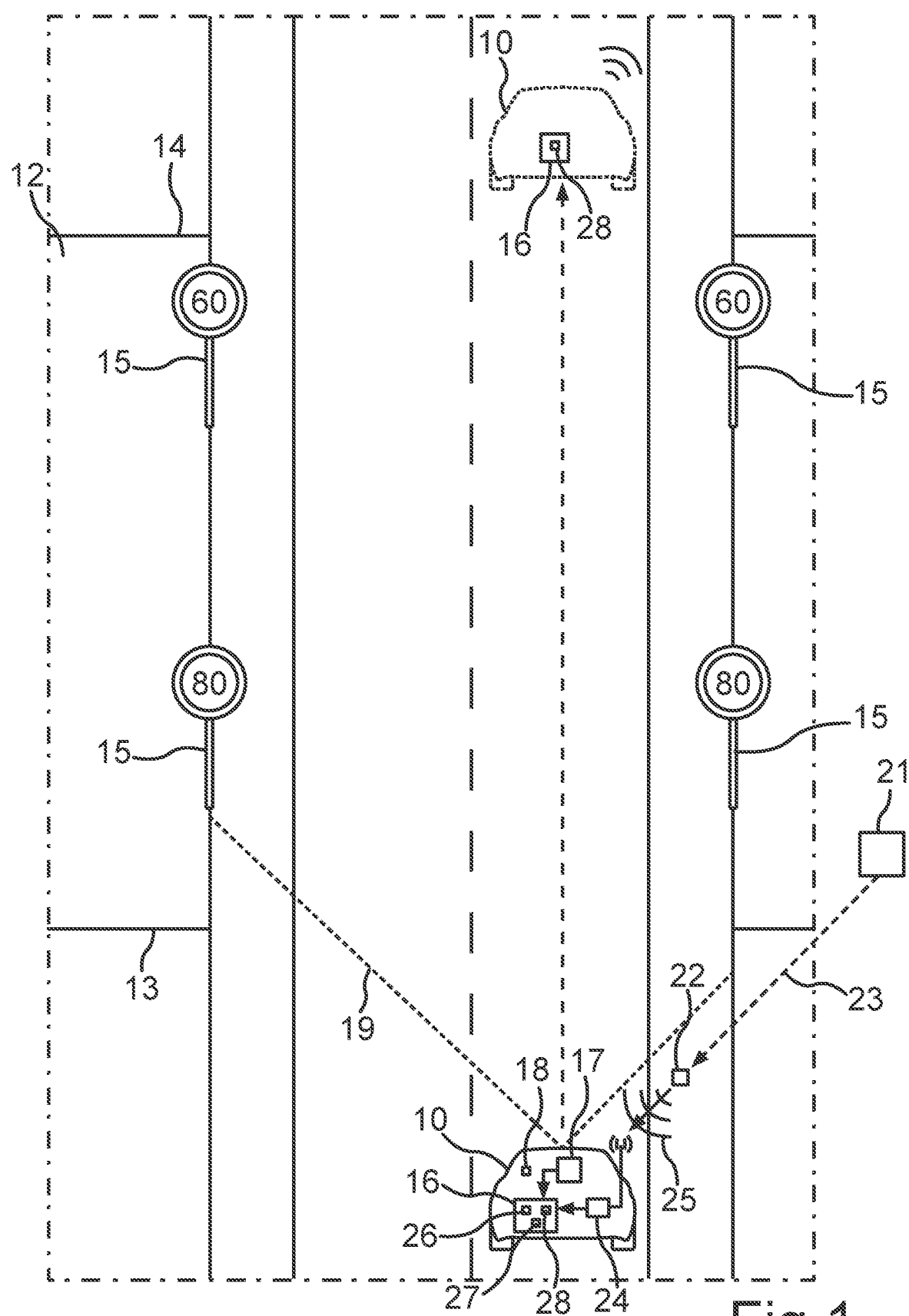
FIG. 1 depicts an example gate region for error detection according to example embodiments of the present disclosure.

In the example embodiments described herein, the components of the embodiments that are described each constitute individual features of the present disclosure to be considered independently of each other, which individually also further develop the present disclosure independently of each other and are thus also to be considered part of the present disclosure both individually and in a combination that is different from the combination described. In addition, the embodiments described may also be supplemented by further features of the present disclosure which have already been described.

In the figures, the same reference numerals designate elements that have the same function.

FIG. 1 shows a motor vehicle 10 which is traveling along a road network 11 and thereby passes a measurement region or gate region 12. The gate region 12 can be delimited, for example, by an entry limit 13 and an exit limit 14. Objects 15 can be located in the gate region 12, in particular stationary objects, such as road signs. The gate region 12 can be used by a control device 16 of the motor vehicle 10 to check at least one environment sensor 17 as to whether the environment sensor 17 is working or functioning correctly or, on the contrary, is malfunctioning. For this purpose, the control device 16 can receive sensor data 18 of the environment sensor 17. A reception region 19 of the environment sensor 17 can be aligned in the gate region 12 so that the objects 15 should be sensed by the environment sensor 17 and described by the sensor data 18 if the environment sensor 17 has a malfunction. On the basis of the sensor data 18, the control device 16 or another control device can determine detection data 20 which describe the objects sensed by the environment sensor 17.

A server device 21 can provide the motor vehicle 10 with reference data 22, which describes which object 15 actually present is present or arranged in the gate region 12. The server device 21 can be a server of the Internet, for example. The reference data 22 can be transmitted, for example, to a communication device 24 of the motor vehicle 10 via a communication link 23. The communication link 23 can also include a radio link 25, which can be implemented, for example, on the basis of a mobile radio standard (for example 3G and/or 4G and/or 5G). The communication device 24 can accordingly have a mobile radio module. The radio connection 25 can also be implemented on the basis of a WLAN connection (WLAN—Wireless Local Area Network). Correspondingly, the communication device 24 can comprise a WLAN radio module. The received reference data 22 can be provided to the control device 16. The control device 16 can now compare the detection data 20 with the reference data 22. A deviation 26 of the detection data 20 from the reference data 22 can be determined and it can be checked whether the deviation 26 fulfills a predefined indicator criterion 27. If the indicator criterion 27 is fulfilled, an entry 28 regarding the fulfillment of the indicator criterion 27 for the gate region 12 can be stored in the SG 16 and/or in the server device 21. For this purpose, the motor vehicle 10 can signal the entry 28 to the server device 21.

Figure 2:
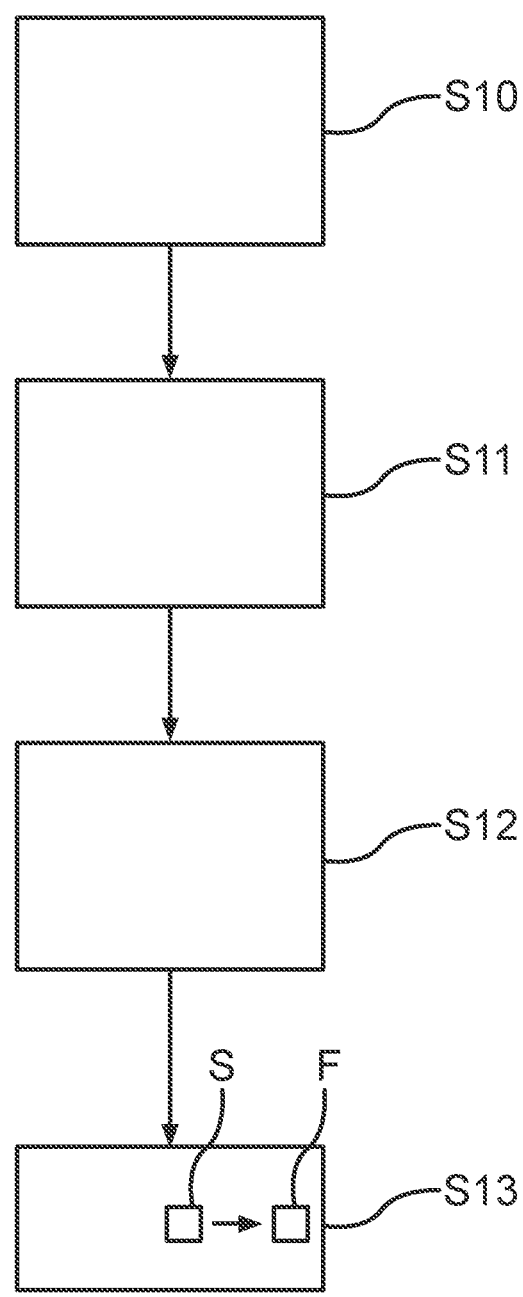
FIG. 2 depicts a flow diagram of an example method according to embodiments of the present disclosure.

Overall, this results in the method illustrated in FIG. 2, in which at least one environment sensor 17 is operated in a step S10 while the motor vehicle 10 passes the gate region 12. On the basis of the respective sensor data 18 of the at least one environment sensor 17, respective detection data 20 are determined in a step S11, the respective detection data 20 each describing which at least one object in the gate region 12 was sensed by the respective environment sensor 17.

In a step S12, in the motor vehicle the at least one object actually present in the gate region 12 can be described on the basis of the reference data 22, the deviation 26 of the detection data 20 from the respective reference data 22 can be determined, and in a step S13 for the case that the deviation fulfills the indicator criterion 27, for the respective environment sensor 17, the detection data 20 of which fulfills the indicator criterion 27, an entry 28 regarding the possible malfunction of the environment sensor 17 can be stored.

The reference data 22 and the detection data 20 can each indicate, for example, the following characteristic features or KPIs (Key Performance Index) for an environment sensor: in the case of traffic sign detection, this can be the symbol classification and/or the position. With lane detection, this can be the lane width and/or the line curvature. Other options are the description of road lights (at night) and/or a surface profile or bumper profile.

A gate region 12 can be described for example by its GPS position or generally its geoposition and/or its status (whether it is new or has already been confirmed several times). The environment sensors provided or affected for the gate region and/or the perception modules provided for the generation of detection data can be specified. Finally, benchmark results for the characteristic features, that is to say tolerance thresholds and/or tolerance ranges, can be specified, by means of which the indicator criterion is then defined.

Figure 3:
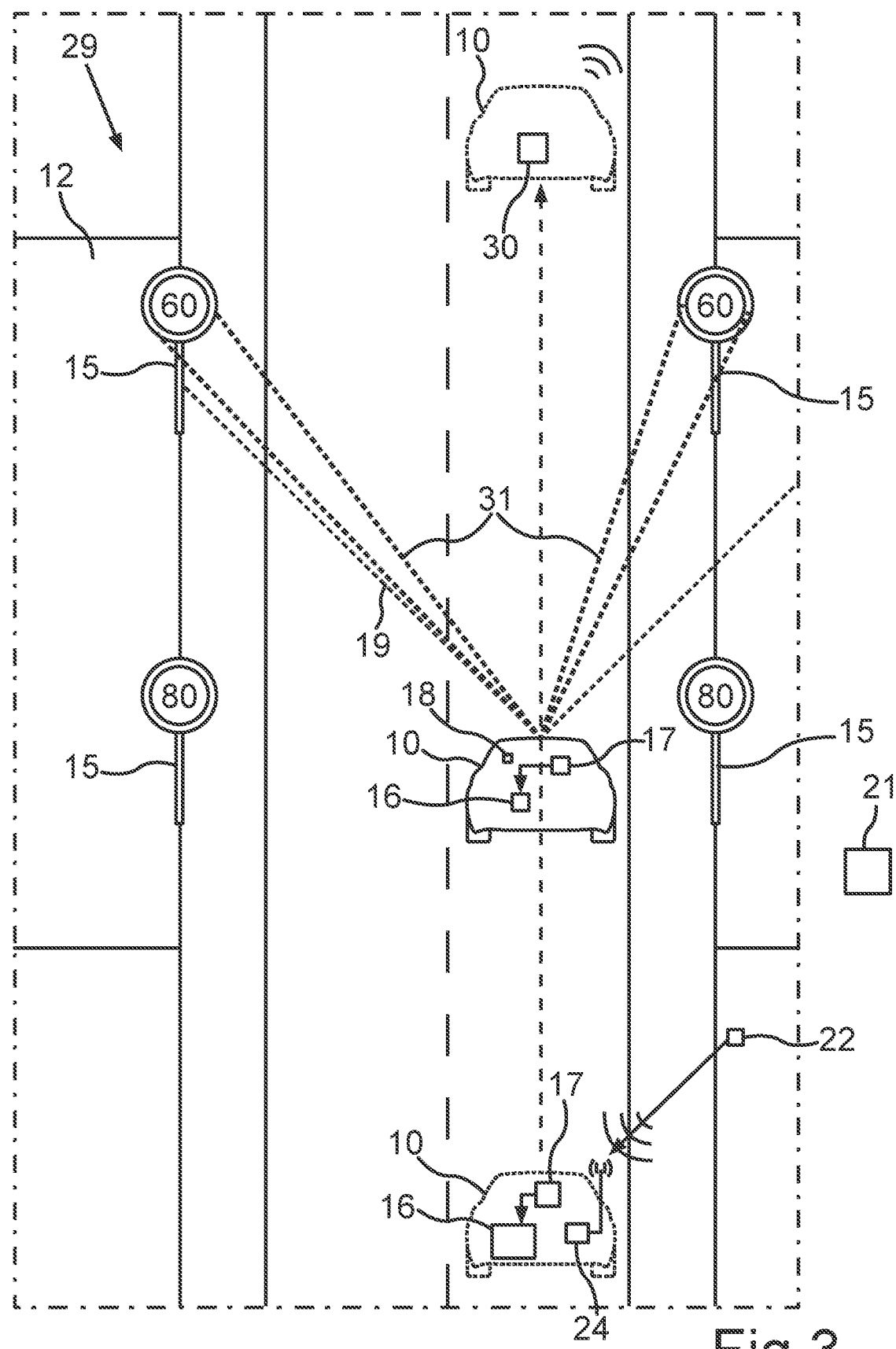
FIG. 3 depicts an example decalibrated environment sensor of a motor vehicle according to example embodiments of the present disclosure.

FIG. 3 illustrates how a remedy 29 for generating new calibration data 30 can be carried out in the event that a plurality of entries 28 for different gate regions 12 indicate that an environment sensor 17 of the motor vehicle 10 is defective or inoperative or has a malfunction. The objects 15 present in the gate region 12 can be used as calibration landmarks. Reference data 22 relating to positions and/or features of calibration landmarks can be received, as well as the geoposition of the gate region 12. While the motor vehicle 10 then passes the gate region 12, the control device 16 can perform a calibration on the basis of the sensor data 18 of the environment sensor 17 to be calibrated and the reference data 22. This can provide that the calibration landmarks, that is to say the objects 15, are detected and then correction data which can be used as calibration data 30 are determined. For a camera, for example, this can be the calculation of the extrinsic camera parameters. A triangulation 31 of several objects 15 in the gate region 12 can be used for this purpose.

If the number of entries exceeds a predefined threshold value S, it can be provided that a malfunction signal F is generated which signals a malfunction of the environment sensor 17. A remedy for the environment sensor can then be triggered.

The server device 21 can then be informed about the calibration or the determined calibration error. It can also be provided that the control device 16 sends out a request to a customer service or maintenance service or a workshop for an appointment in order to organize the repair or recalibration of the environment sensor by means of a calibration device in a workshop.

By networking vehicles via a backend in the form of a server device 21, the performance and detection results of sensor systems of different vehicles can be compared with one another. For this purpose, virtual gate regions at significant locations/route sections are used, which are registered in the backend and enable a comparison between the individual networked vehicles.

For the purposes of comparability, key performance indicators (KPIs) are used, which represent characteristic features of detected objects, landmarks or structures (e.g. track width, position and class of traffic signs). If a poor performance of an environment sensor is found compared to other vehicles, the driver is informed of the fault and the safety-critical functions concerned can be deactivated until the malfunction has been remedied.

Furthermore, the information can be used to carry out a first fault diagnosis, i.e. which sensor is affected and whether the cause is sensor blindness or decalibration. Depending on the type and severity of the fault, suitable measures are taken to remedy the fault.

This offers the possibility of quickly and reliably detecting functional restrictions/faults in sensor systems. The reference truth required for this is provided by the networked vehicle fleet and existing landmarks and features (generally objects) in the road network. Depending on the type of fault, suitable follow-up measures are initiated to minimize the duration of the disruption. The concept increases the availability and reliability of the sensor system as well as the functional robustness of the automated driving functions based on it. At the same time, the probability is reduced that an error in the sensor system is incorrectly detected and the user is asked to contact the customer service for no reason (reduction in the false positive rate).

Gate regions are generated at locations that are particularly suitable for such a check due to their nature. The selected locations have objects, landmarks or structures that are detected very robustly by the respective sensor under normal circumstances, and may only be relevant for individual sensor types (camera, laser, radar) and installation positions (front, side, rear). For camera systems, this can be e.g. a location or route section with permanently installed traffic signs and lane markings (see FIG. 1).

When a networked vehicle traverses a suitable route section for the first time, the GPS data and detected objects (including properties such as class and position) are transmitted to the backend and registered there as a gate region. The backend sends the positions and KPIs of relevant gate regions to the networked vehicle fleet. If one of these vehicles now travels a route section with a gate region, it documents the detection results of its sensor system, compares the performance with the current benchmark and sends significant deviations (positive and negative) back to the backend. The feedback from the vehicle fleet is used to continuously update the KPIs of the gate regions in the backend.

If there are (repeatedly) significant negative anomalies in a single vehicle, the driver is informed and the error is analyzed in order to initiate suitable follow-up measures. Sensor blindness due to weather influences is usually only temporary, no further measures are necessary. If the sensor is covered with dirt, however, the driver is asked to clean the corresponding sensor. In the event of a decalibration, a self-healing process can be started by recalibration, which recalculates the extrinsic parameters of the sensor based on landmarks transmitted from the back end in a suitable route section (sensor calibration gate) (see FIG. 3).

If the problem persists after the remedies have been fully implemented, the user is asked to contact the customer service. If highly automated driving functions (level 3-5) are affected by the sensor restriction, they are also informed about the fault and, if necessary, deactivated for safety reasons.

Overall, the examples show how the present disclosure allows for the definition of sensor gate regions for diagnosing at least one faulty environment sensor of a vehicle by means of swarm data from several motor vehicles.

The invention claimed is:

1. A method for detecting a malfunction of at least one environment sensor of a motor vehicle, the method comprising:
    operating the at least one environment sensor while the motor vehicle passes a predefined gate region of a road network;
    determining detection data based at least in part on sensor data from the at least one environment sensor obtained while the motor vehicle passes the predefined gate region, the detection data describing at least one object in the gate region that was sensed based on the sensor data;
    determining a deviation of the detection data from reference data describing at least one object actually present in the gate region, the reference data describing a ratio of at least two characteristic features of the at least one object actually present; and
    storing an entry regarding a malfunction of the at least one environment sensor when the deviation fulfills a predefined indicator criterion.

2. The method according to claim 1, wherein the indicator criterion differentiates between a sensor blindness, in which at least one object actually present in the gate region remains undetected, and a decalibration, in which at least one object actually present in the gate region is detected at an incorrect position or with an incorrect spatial orientation.

3. The method according to claim 1, wherein the reference data describes at least one of a class, position, dimension, and proportion of the at least one object actually present.

4. The method according to claim 1, wherein the reference data describes several objects actually present in the gate region.

5. The method according to claim 1, further comprising generating a malfunction signal when a number of entries regarding the malfunction of the at least one environment sensor is greater than a predefined threshold value.

6. The method according to claim 5, further comprising at least one of providing a warning message to a driver of the motor vehicle in response to the malfunction signal, and deactivating a vehicle function associated with the at least one environment sensor in response to the malfunction signal.

7. The method according to claim 5, further comprising:
    generating calibration data for the at least one environment sensor based at least in part on the sensor data, the reference data, and the malfunction signal; and
    initiating a predefined remedy for recalibration of the at least one environment sensor based at least in part on the calibration data.

8. The method according to claim 1, wherein the reference data is generated by a server device based at least in part on respective second detection data associated with objects along the gate region of the road network from a plurality of other motor vehicles.

9. A control device for a motor vehicle, wherein the control device has a processor device configured to:
    operate at least one environment sensor of the motor vehicle while the motor vehicle passes a predefined gate region of a road network;
    determine detection data based at least in part on sensor data from the at least one environment sensor obtained while the motor vehicle passes the predefined gate region, the detection data describing at least one object in the gate region that was sensed based on the sensor data;
    determine a deviation of the detection data from reference data describing at least one object actually present in the gate region, the reference data describing a ratio of at least two characteristic features of the at least one object actually present; and
    store an entry regarding a malfunction of the at least one environment sensor when the deviation fulfills a predefined indicator criterion.

* * * * *